United States Patent
Meher et al.

(10) Patent No.: US 12,486,446 B2
(45) Date of Patent: Dec. 2, 2025

(54) CATALYST FOR EXOTHERMIC REACTION IN A WELLBORE

(71) Applicant: Halliburton Energy Services, Inc., Houston, TX (US)

(72) Inventors: Pratiksha Shivaji Meher, Pune (IN); Amit Agrawal, Pune (IN); Jason Maxey, Houston, TX (US); Ramesh Uppuluri, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 10 days.

(21) Appl. No.: 17/857,870

(22) Filed: Jul. 5, 2022

(65) Prior Publication Data

US 2024/0010905 A1 Jan. 11, 2024

(51) Int. Cl.
*E21B 43/34* (2006.01)
*C09K 8/584* (2006.01)
*C09K 8/592* (2006.01)
*C09K 8/92* (2006.01)

(52) U.S. Cl.
CPC .............. *C09K 8/592* (2013.01); *C09K 8/584* (2013.01); *C09K 8/92* (2013.01)

(58) Field of Classification Search
CPC .......... C09K 8/592; C09K 8/584; C09K 8/92; E21B 43/34
USPC .......................................................... 166/260
See application file for complete search history.

(56) References Cited

U.S. PATENT DOCUMENTS

| | | | |
|---|---|---|---|
| 624,743 | A | 5/1899 | Blackford |
| 4,178,993 | A | 12/1979 | Richardson et al. |
| 4,219,083 | A * | 8/1980 | Richardson ............. E21B 37/00 166/300 |
| 4,410,041 | A | 10/1983 | Davies et al. |
| 4,755,230 | A | 7/1988 | Ashton et al. |
| 6,488,091 | B1 * | 12/2002 | Weaver ..................... C09K 8/62 166/305.1 |
| 10,947,827 | B2 * | 3/2021 | Maligon ................. E21B 43/25 |
| 2004/0018943 | A1 * | 1/2004 | Pyecroft .................. C09K 8/90 507/100 |

(Continued)

FOREIGN PATENT DOCUMENTS

WO 2008032067 A1 3/2008

OTHER PUBLICATIONS

Akers, "Formation and Removal of Hydrates Inside Wellhead Connectors", Society of Petroleum Engineers, SPE 124409, Oct. 4, 2009, pp. 1-15.

(Continued)

*Primary Examiner* — William D Hutton, Jr.
*Assistant Examiner* — Ashish K Varma
(74) *Attorney, Agent, or Firm* — Kilpatrick Townsend & Stockton LLP

(57) ABSTRACT

Described herein is a low-temperature catalyst and method of use for causing an exothermic reaction in a low temperature environment. The mixture can include sodium nitrite, an ammonium-based compound, and an oxidizer and can be injected into a fluid flow path. The fluid flow path can be a pipeline, a flowline, a wellbore, or a subterranean formation. The mixture can cause an exothermic reaction in the fluid flow path and remove, using the exothermic reaction, a damaging material from the fluid flow path.

19 Claims, 7 Drawing Sheets

(56) References Cited

U.S. PATENT DOCUMENTS

| | | | |
|---|---|---|---|
| 2004/0163813 A1* | 8/2004 | Slabaugh | C09K 8/512 |
| | | | 507/216 |
| 2008/0069961 A1* | 3/2008 | Sarkar et al. | 427/384 |
| 2010/0139924 A1 | 6/2010 | Abney | |
| 2014/0318791 A1 | 10/2014 | Mancini et al. | |
| 2017/0073571 A1 | 3/2017 | Salla et al. | |
| 2018/0093948 A1* | 4/2018 | Balasubramanian | C23F 11/10 |
| 2019/0185739 A1 | 6/2019 | Al-nakhli et al. | |

OTHER PUBLICATIONS

Alade et al., "A Novel Method of Removing Emulsion Blockage after Drilling Operations Using Thermochemical Fluid", SPE Drilling & Completion, vol. 36, No. 1, Mar. 17, 2021, pp. 88-100.

Alharith et al., "A Novel Approach for Near Wellbore Stimulation and Deposits Removal Utilizing Thermochemical Reaction", Society of Petroleum Engineers, SPE-204771-MS, Dec. 15, 2021, 10 pages.

Al-Nakhli et al., "A Novel Thermochemical Fracturing Approach to Reduce Fracturing Pressure of High Strength Rocks", Society of Petroleum Engineers, SPE-197593-MS, Nov. 11, 2019, 12 pages.

Al-Nakhli et al., "Chemically-Induced Pressure Pulse to Increase Stimulated Reservoir vol. in Unconventional Reservoirs", Unconventional Resources Technology Conference, URTeC: 1922369, Aug. 25, 2014, pp. 1-19.

Al-Nakhli et al., "In-Situ Steam Generation A New Technology Application for Heavy Oil Production", Society of Petroleum Engineers, SPE-184118-MS, Dec. 6, 2016, pp. 1-19.

Al-Nakhli et al., "Novel Condensate Removal with In-Situ Pressure Generation Via Thermochemical Fluids in Different Sandstone Formations", Society of Petroleum Engineers, SPE-196523-MS, Oct. 25, 2020, 15 pages.

Alyousef et al., "Evaluation of In-Situ Generation of Nitrogen Gas for Foam Applications Using Two Salt Solutions", Society of Petroleum Engineers, SPE-207605-MS, Dec. 9, 2021, pp. 1-11.

Ashton et al., "In-Situ Heat System Stimulates Paraffinic-Crude Producers in Gulf of Mexico", SPE Production Engineering, vol. 4, No. 2, May 1, 1989, pp. 157-160.

Bispo et al., "pH-Based Control of the Kinetics and Process Safety of the Highly Exothermic Reaction Between Ammonium Chloride and Sodium Nitrite for Flow-Assurance Applications", SPE Journal, vol. 26, No. 6, Dec. 2021, pp. 3634-3642.

Collesi et al., "Surface Equipment Cleanup Utilizing In-Situ Heat", Society of Petroleum Engineers, SPE 16215, Mar. 8, 1987, pp. 305-311.

Davies et al., "Field Application of In-Situ Nitrogen Gas Generation System", Society of Petroleum Engineers, SPE 9653, Mar. 9, 1981, 10 pages.

Evangelista et al., "Removal of a Hydrate Plug From a Subsea Christmas-Tree Located in Ultra-Deep Waters with the Aid of a Heat-Releasing Treating Fluid", Offshore Technology Conference, OTC 19730, May 4, 2009, pp. 1-8.

Folomeev et al., "Acidizing Combined with Heat Generating System in Low-Temperature Dolomitized Wax Damaged Carbonates", Society of Petroleum Engineers, SPE-202069-MS, Oct. 26, 2020, 27 pages.

Freitas et al., "Formation and Removal of a Hydrate Plug Formed in the Annulus Between Coiled Tubing and Drill String", Offshore Technology Conference, OTC 17229, May 2, 2005, pp. 1-6.

Goenka et al., "Near Wellbore Asphaltene and Wax Remediation Using In-Situ Heat Generation in Both PCP and Non-PCP Wells: Concept, Operational Challenges & Remedial Solutions", Society of Petroleum Engineers, SPE-171497-MS, Oct. 14, 2014, pp. 1-14.

Gomaa, "Formation Integrity and Pore System Evaluation for Stimulated Sandstone Formation Using In-Situ Generated Acid Catalyzed by a Fused Chemical Reaction", Society of Petroleum Engineers, SPE-204266-STU, Oct. 19, 2020, 10 pages.

Hassan et al., "Development of A New Chemical Treatment for Removing Water Blockage in Tight Reservoirs", Society of Petroleum Engineers, SPE-194879-MS, Mar. 15, 2019, pp. 1-10.

Hassan et al., "Enhance the Gas Productivity for Shale Gas Reservoirs Using Thermochemical Treatment", International Petroleum Technology Conference, IPTC-19603-Abstract, Jan. 13, 2020, pp. 1-12.

Hassan et al., "Mitigation of Gas Condensate Banking Using an Integrated Chemical Approach", Society of Petroleum Engineers, SPE-207665-MS, Dec. 9, 2021, pp. 1-9.

Hassan et al., "Novel Sandstone Stimulation Using Thermochemical Fluid: Successful Field Application", Society of Petroleum Engineers, SPE-207702-MS, Dec. 9, 2021, pp. 1-8.

Hassan et al., "Permanent Removal of Condensate Banking in Tight Gas Reservoirs Using Thermochemicals", Society of Petroleum Engineers, SPE-193609-MS, Mar. 29, 2019, pp. 1-11.

Karbouj, "Integrated Evaluation of Thermo-Chemical Injection in Carbonate Reservoirs", SPE Annual Technical Conference and Exhibition, SPE 167634-STU, Sep. 30, 2013, pp. 1-17.

Khalil et al., "Improving Matrix Acidizing with Nitrogen and Heat In-Situ Generation", Society of Petroleum Engineers, SPE 21113, Oct. 14, 1990, 7 pages.

Khalil et al., "Thermochemical Process To Remove Paraffin Deposits in Subsea Production Lines", Offshore Technology Conference, OTC 7575, May 2, 1994, 8 pages.

Koochi et al., "Thermo-Gas-Chemical Stimulation as a Revolutionary Ior-Eor Method by the In-Situ Generation of Hot Nitrogen and Acid", Society of Petroleum Engineers, SPE-205948-MS, Sep. 2021, pp. 1-10.

Lee et al., "Chemistry of Persulfates for the Oxidation of Organic Contaminants in Water", Membrane Water Treatment, vol. 9, No. 6, Nov. 2018, pp. 405-419.

Lishcuk et al., "The Results of Pilot and Industrial Application of Thermal-Gas-Chemical Well Treatment with Binary Mixtures and Development of Mathematical Models for Reservoir Processes in Source Oil Rock", Society of Petroleum Engineers, SPE-201812-MS, Oct. 26, 2020, pp. 1-10.

Marques et al., "New Flow Assurance Solutions to Work Out Hydrate and Paraffin Blockage Problems in Deepwaters", Offshore Technology Conference, OTC 15190, May 5, 2003, pp. 1-7.

Mcspadden et al., "In-Situ Heat and Paraffin Inhibitor Combination Prove Cost Effective in NPR #3, Casper Wyoming", Society of Petroleum Engineers, SPE 15098, Apr. 2, 1986, 8 pages.

Mitchell et al., "Field Application of a Chemical Heat and Nitrogen Generating System", Society of Petroleum Engineers, SPE 12776, Apr. 11, 1984, 7 pages.

Moussa et al., "Performance and Economic Analysis of a Novel Heavy Oil Recovery Process Using In-Situ Steam and Nitrogen Generated by Thermochemicals", Society of Petroleum Engineers, SPE-192432-MS, Apr. 22, 2018, pp. 1-20.

Oskui et al., "Screening Potential Production Technologies for the Lower Fars Heavy Oil Asset in Kuwait", Society of Petroleum Engineers, SPE 126268, Dec. 14, 2009, pp. 1-15.

Qamruzzaman et al., "Combating Production Loss Due to Paraffin Deposition: A Success Story of Thermochemical Stimulation in Western India", Society of Petroleum Engineers, SPE-202457-MS, Nov. 12, 2020, 18 pages.

Qamruzzaman et al., "Novel Simulator for Design and Analysis of Wax Removal Treatment from Well Flowlines Using Thermochemical Fluids", SPE Production & Operations, vol. 37, No. 2, May 2022, pp. 301-318.

Qian et al., "A Novel in Situ N2 Generation System Assisted by Authigenic Acid for Formation Energy Enhancement in an Oilfield", RSC Advances, vol. 9, No. 68, Dec. 2019, pp. 39914-39923.

Romeu et al., "Paraffin Precipitation in the Formation in Dom Joao Field, Brazil", Society of Petroleum Engineers, SPE 21108, Oct. 14, 1990, 6 pages.

Santos et al., "Proposal and Experimental Trials on a Robot for Hydrate and Paraffin Removal in Submarine Flexible Lines", Offshore Technology Conference, OTC-30663-MS, May 4, 2020, pp. 1-21.

(56) References Cited

OTHER PUBLICATIONS

Sierra et al., "DTS Monitoring of Hydraulic Fracturing: Experiences and Lessons Learned", Society of Petroleum Engineers, SPE 116182, Sep. 21, 2008, 15 pages.
Tiwari et al., "In-Situ Heat Generation for Near Wellbore Asphaltene and Wax Remediation", International Petroleum Technology Conference, IPTC 17681, Jan. 19, 2014, 9 pages.
International Patent Application No. PCT/US2023/021687, International Search Report and Written Opinion mailed Aug. 30, 2023, 11 pages.

* cited by examiner

CATALYST FOR EXOTHERMIC REACTION IN A WELLBORE

TECHNICAL FIELD

The present disclosure relates generally to wellbore operations, flow lines and, more particularly (although not necessarily exclusively), to a low temperature catalyst for an exothermic reaction in a subterranean formation, a wellbore, or a flowline.

BACKGROUND

Wellbore operations may include various equipment, components, methods, or techniques to displace and release hydrocarbon fluids for recovery from a subterranean or sub-oceanic formation and hydrocarbon flow lines including surface and subsea pipelines. A pipeline along the ocean floor may be used to transport hydrocarbon fluids from the field or gathering systems to refineries. Hydrocarbons can flow from the formation into the tubulars of the wellbore from relatively high temperatures in the formation to somewhat lower temperatures in the tubulars or later into the flowline/pipeline where the temperature varies. The pipeline can have areas of high temperatures and areas of low temperatures. The temperature gradient within the subterranean formation, the wellbore or the pipeline can create an environment in which damaging material such as paraffin accumulates, and the damaging material can cause issues with the flow of hydrocarbons through the wellbore or pipeline that can impact various operations.

DETAILED DESCRIPTION

Figure 1:
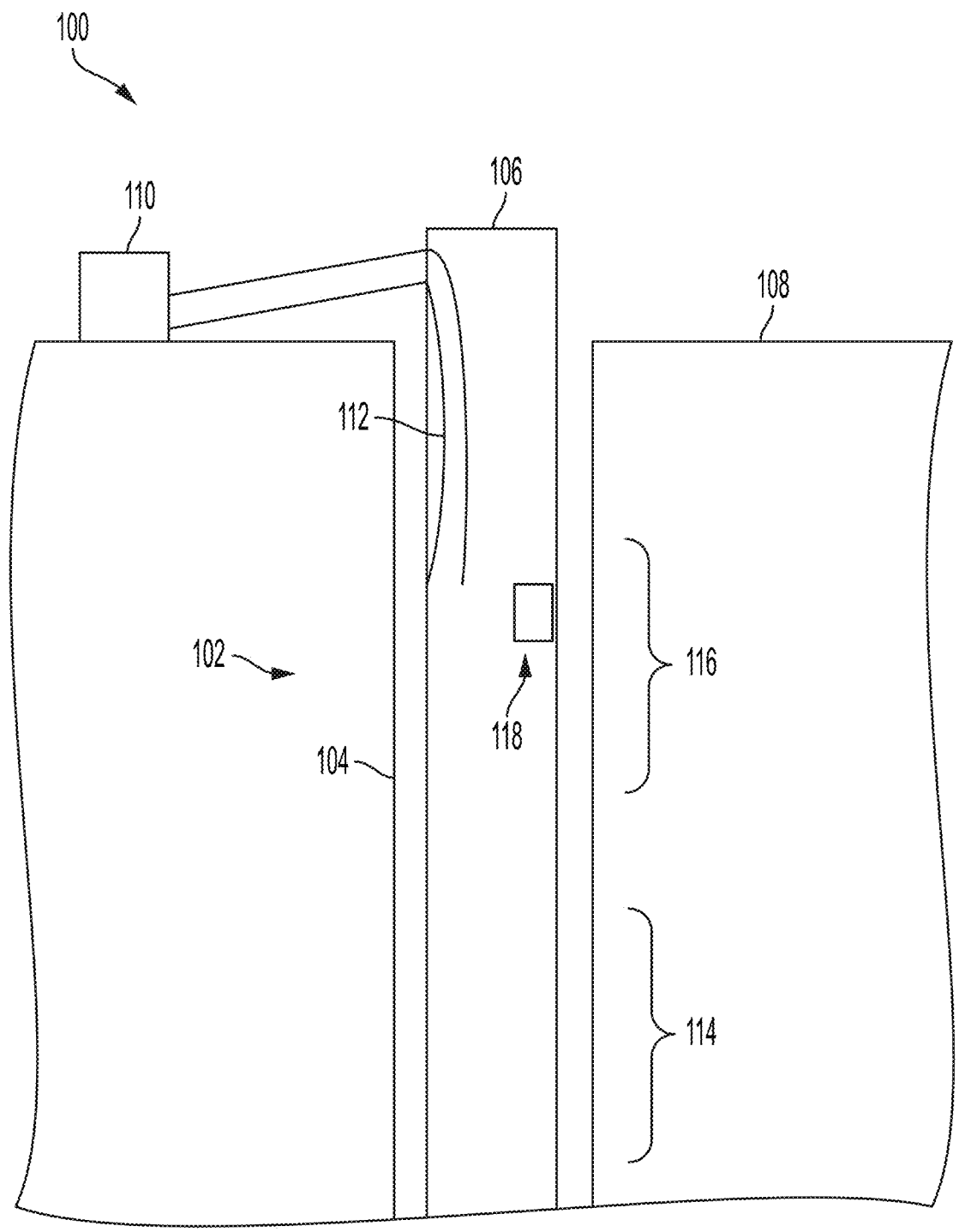
FIG. 1 is a schematic of an example of a wellbore and surface equipment for deploying an exothermic reaction mixture with a low-temperature catalyst for removing damaging material from a wellbore according to one example of the present disclosure.

Certain aspects and examples of the present disclosure relate to a low temperature catalyst for initiating an exothermic reaction in target low-temperature zones for removing damaging material. A catalyst can be used in a reaction mixture to increase the rate of reaction. An exothermic reaction can produce or otherwise release energy upon reacting, and the energy can be released as heat to an area surrounding the exothermic reaction. Wellbore operations can include entering subterranean formations deep below the surface. The deep operations may include areas within the wellbore or flowlines where the temperature varies from areas of high temperature to areas of low temperature intermittently from the bottom to the top. The low temperature zones may cause hydrocarbon fluids to form damaging material. The damaging material can include waxes, paraffin deposits, scales, and the like that can restrict the flow of the hydrocarbon fluid with respect to the flowline. For example, the low temperature zones may accumulate paraffin deposits along the inner walls of the wellbore, and over time, the paraffins gradually decrease the inner diameter of the wellbore until no fluid can pass through the wellbore. The increased temperature can also help remove emulsions which have formed downhole.

Other techniques used during a wellbore operation for removing damaging material may include acid stimulation treatments for acid soluble materials. Acid soluble materials can include scale material and acid soluble plugging material such as calcium carbonate, salts and clays (soluble in hydrofluoric acid). Removing damaging material may also include the use of solvents such as xylene for removal of organic material such as paraffins or asphaltenes. Additional techniques used during a wellbore operation for removing damaging material may include methods such as the use of pumping hot oil downhole to thin down paraffins or the use of scrapers to remove material from the inner diameter of the tubulars. Devices such as pigs can be pumped through pipelines to try and remove excess material from the pipeline. The other techniques may suffer from increasing operation time, requiring additional workover, and may negatively impact the reservoir structure.

To remove damaging material without impacting the wellbore operation, an exothermic reaction mixture can be used with a low temperature catalyst. The exothermic reaction and the low temperature catalyst can generate energy release in the form of an exotherm and the generation of nitrogen when used in temperatures below approximately 70° F. (21° C.). For example, during wellbore operations, incorporating the exothermic reaction mixture and low temperature catalyst into the target zone can increase the temperature within the target zone of the wellbore while other operations are being performed. The other operations may include, for example, a production operation, a drilling operation, a completion operation, a stimulation treatment, or any other suitable operation within the wellbore. The reaction mixture can include an ammonium-based compound, sodium nitrite, and a catalyst, and the reaction mixture can be injected into the wellbore at one or more target locations for raising the temperature of the surrounding environment to remove damaging material from the wellbore.

In the case where a catalyzed exothermic reaction such as that provided by the mixture of ammonium chloride ($NH_4Cl$) and sodium nitrite, the reaction can be catalyzed by the inclusion of an acid which may be encapsulated for delayed release within the reaction mixture. The acid may be encapsulated in a soluble polymer. However, the soluble polymer used to encapsulate the acid may form non-uniform layers around the acid that may vary the encapsulated acid release. A raw acid can be used to initiate the exothermic reaction; however, the raw acid may initiate the exothermic reaction instantaneously. The delayed acid release may not initiate a reaction unless the temperature is at or above approximately 70° F. (21° C.) to initiate the respective reaction. The other techniques may not be able to be used in a low temperature environment for controlling an exothermic reaction.

In some examples, raising the temperature of the wellbore at a target location may cause the damaging material to be removed from the target location. For example, the exothermic reaction can be initiated in the target location, and the heat from the exothermic reaction may remove the damaging material from the target location. In some examples, the exothermic reaction may not initialize below approximately 70° F. (21° C.), and the catalyst may facilitate initiation of the reaction at or below approximately 70° F. (21° C.). The reaction mixture can be controlled via the addition of buffer for delaying the release of energy allowing for targeted energy release as a delay mechanism. Additionally, or alternatively, the reaction mixture can include a surfactant for controlling the energy release.

During a wellbore operation, the tubulars of the wellbore may include areas of high temperatures and areas of low temperatures intermittently from the bottom of the wellbore to the top of the wellbore. When an area of low temperature within the tubular or flowline comes in contact with the hydrocarbon fluids during the wellbore operation, damaging material can build up along the inner side of the tubular or flowline and restrict the flow of hydrocarbon fluid from the wellbore. Damaging materials can include organic material and inorganic material that may negatively impact the wellbore operation. For example, damaging material can include scales, waxes, paraffin deposits, emulsions, and the like. The exothermic reaction and low temperature catalyst can be used, for example, when the temperature within the wellbore is at or below approximately 70° F. (21° C.). Additionally, the low temperature catalyst and exothermic reaction can include elements that increase or decrease the rate of the reaction. The elements added to the exothermic reaction and catalyst can control the energy release from the reaction to the surrounding environment. In some wellbores, the reaction mixture and the catalyst can include a buffer, a surfactant, a solvent, or a suitable combination thereof, to affect (e.g., increase, decrease, etc.) the rate of reaction. The addition of the catalyst and other components can be deployed in the wellbore to targeted depths.

As used herein, the terms "pipeline", "flowline", "tubular", or "wellbore" are intended to refer broadly to a flow path in which material can build up. The flow path for example can be from within a sub-oceanic formation or subterranean formation through which a pipeline, flowline, tubular, or wellbore can be positioned. The exothermic reaction can be used in any or all combinations of the above for increasing the reaction temperature to aid in or remove damaging material from the fluid flow path.

These illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a schematic of an example of a wellbore system 100 that can accumulate damaging material 118 according to one example of the present disclosure. The damaging material 118 can accumulate within the tubular or flowline 106 of the wellbore 104. The wellbore 104 and tubular or flowline 106 can be within a subterranean formation 102 for a wellbore operation. The tubular or flowline 106, for example, may be a pipeline, a production tubing, a casing, pup joints, drill collars, a drill pipe, or other embodiments of hydrocarbon pipes. During a wellbore operation, the wellbore 104 can be injected with fluids using fluid pumps 110 located at the surface 108. The fluid pumps 110 can be in liquid contact with the tubular or flowline 106 of the wellbore 104. The fluid pumps can be in fluid contact with the tubing 112 for targeted fluid release within the tubular or flowline 106 of the wellbore 104. The fluid pumps 110 can be controlled for changing the fluid flow pressure or flow rate within the tubing 112. In some examples, the fluid pumps 110 can be controlled by a computer to control the parameters of liquid dynamics within the wellbore 104.

The wellbore 104 can include a high temperature segment 114 and a low temperature segment 116. The low temperature segment 116 can cause the build-up of damaging material 118, such as scales, waxes, paraffins, etc., that can reduce the efficiency or output of the wellbore operation within the wellbore 104. The low temperature segment 116 and high temperature segment 114 can be intermittently dispersed thought the tubular or flowline 106 within the wellbore 104 from the bottom of the subterranean formation 102 to the top of the tubular or flowline 106 within the wellbore 104. For example, the wellbore 104 may include a low temperature segment 116 located at the bottom of the subterranean formation followed by a high temperature segment 114 above the low temperature segment 116. The tubular or flowline 106 within the wellbore 104 that is within the subterranean formation 102 may have one or more low temperature segments 116 that may include the damaging material 118 adhered to the tubular or flowline 106. The one or more low temperature segments 116 can cause multiple segments within the tubular or flowline 106 to experience reduced hydrocarbon flow.

The tubing 112 can be disposed in the wellbore 104 to a targeted depth. The targeted depth can be a low temperature segment 116 within the wellbore 104. The fluid pumps 110 can inject the reaction mixture into the wellbore 104 through the tubing 112. The reaction mixture can otherwise suitably be positioned in the wellbore 104. The exothermic reaction can increase the surrounding temperature within the tubular or flowline 106 of the wellbore 104 and can remove the damaging material 118 from the wall of the tubular or flowline 106. For example, the tubing 112 can be deployed into a low temperature segment 116 in which the temperature of the wellbore 104 is at or below approximately 70° F. (21° C.). In some examples, a catalyst may be used to initiate the exothermic reaction at the low temperature. The exothermic may generate energy in the form of heat to the surrounding environment of the low temperature segment 116 to increase the temperature of the tubular or flowline 106 within the wellbore 104. The increase in the temperature of the tubular or flowline 106 may remove or at least partially remove the damaging material 118 from the wall of the tubular or flowline 106. The damaging material 118 can be pumped out from the wellbore or can return to the subterranean formation 102. In some examples, the damaging material 118 can be removed or broken down such that it can be flowed from the flowline 106 using the exothermic reaction mixture and oxidizer in the low temperature segment 116 to increase the flow of hydrocarbons through the flowline 106.

Figure 2:
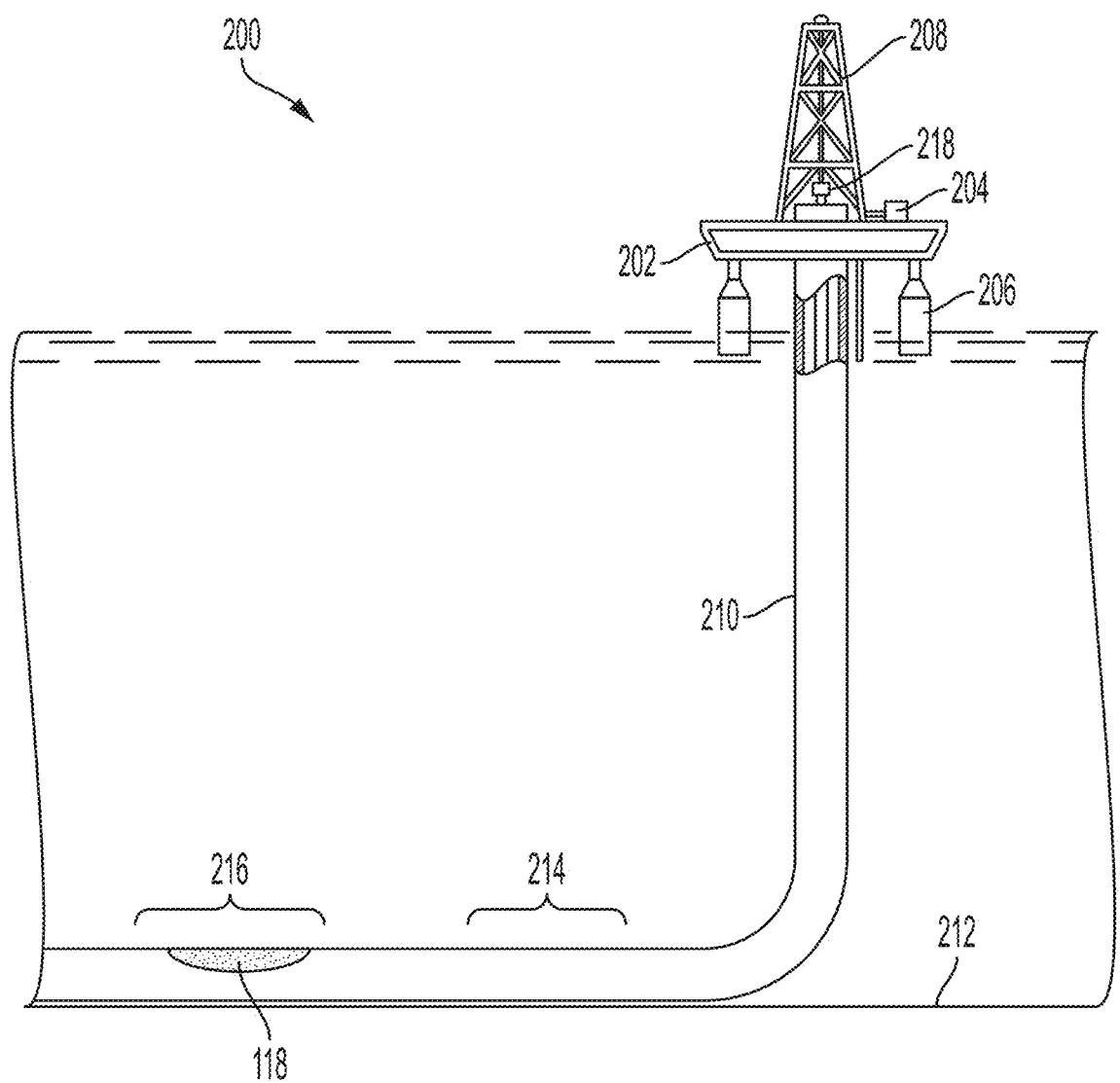
FIG. 2 is a schematic of an example of an offshore environment with a flowline for carrying fluids that can include damaging material in lower temperature segments according to one example of the present disclosure.

FIG. 2 is a schematic of an example of an offshore environment with a flowline 210 for carrying fluids according to one example of the present disclosure. The offshore environment 200 can include a floating workstation 206 that can be positioned over a submerged oil or gas flowline located along a sea floor 212. The floating workstation can include a derrick 208 and a hoisting apparatus 218 for raising and lowering tools to test the flowline 210. A pump 204 located on the deck 202 can inject fluid into the flowline 210 for removing damaging material 118 that can build up in the flowline 210. The floating workstation 206 can be an oil platform as depicted in FIG. 2 or an aquatic vessel capable of performing the same or similar wellbore operations. In some examples, the techniques described herein can also be applied to land-based context for flowline and wellbore management. The flowline 210 can range in lengths from a few hundred meters to several kilometers and can be varied depending on the operation in which the flowline 210 is being employed.

The flowline 210 can include a high temperature segment 214 and a low temperature segment 216. The low temperature segment 116 can cause the build-up of damaging material 118, such as scales, waxes, paraffins, etc., that can reduce the efficiency or output of the flowline 210. The low temperature segment 216 and high temperature segment 214 can be intermittently dispersed thought the flowline 210. The flowline 210 that is located along the sea floor 212 may have one or more low temperature segments 216 that may include the damaging material 118 adhered to the inner wall of the flowline 210. The one or more low temperature segments 216 can cause multiple segments within the flowline 210 to experience reduced hydrocarbon flow. Accordingly, an exothermic reaction solution can be provided, for example in the low temperature segment 216, for removing the damaging material 118.

Figure 3:
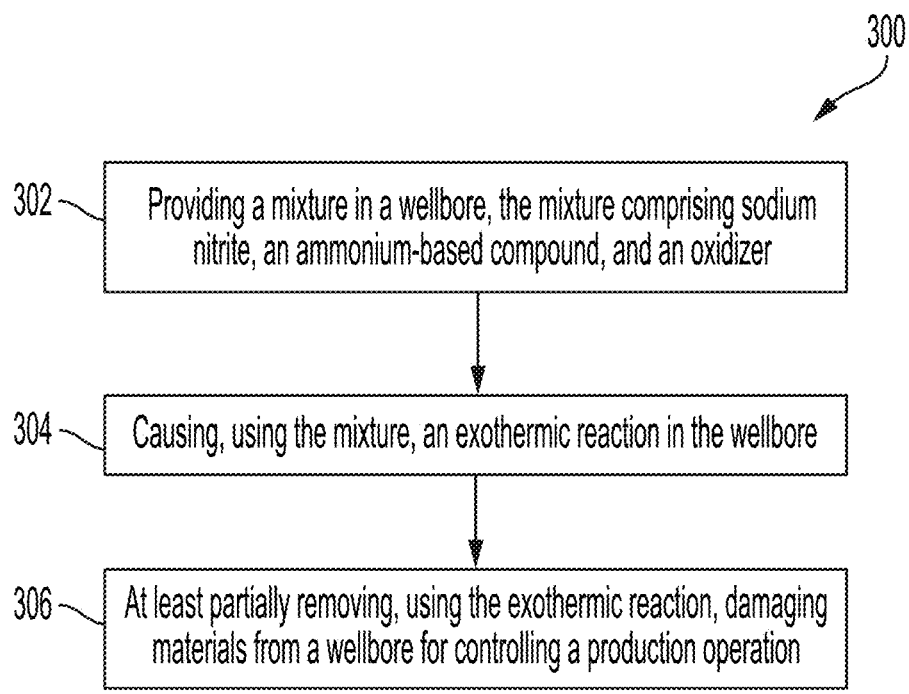
FIG. 3 is a flowchart of a process for removing damaging material from a subterranean formation, a wellbore, or a pipeline using a low-temperature catalyst for an exothermic reaction according to one example of the present disclosure.

FIG. 3 is a flow chart of a process 300 for removing the damaging material 118 from the wellbore or pipeline 104 according to one example of the present disclosure. At block 302 a mixture is provided in the wellbore 104. The mixture can include an exothermic reaction mixture that can include sodium nitrite, an ammonium-based compound, and an oxidizer. For example, the reaction mixture may include sodium nitrite, ammonium chloride, and sodium persulfate or ammonium persulfate. Other permutations of the reaction mixture can be used. An operator of the wellbore 104 may deploy or otherwise position the tubing 112 into the wellbore 104 at a desired depth. The operator can inject the reaction mixture into the wellbore 104. In some examples, a computing device or other automatic control device can deploy the tubing 112 in the wellbore 104 and inject (or provide) the reaction mixture into the wellbore 104.

Additionally, the reaction mixture can include a buffer, a surfactant, a solvent, an acid, or other well-known stimulation fluids for aiding in damage removal and controlling the exothermic reaction. For example, a buffer can be a combination of one or more of ammonium hydroxide, sodium bicarbonate, sodium hydroxide, potassium carbonate, ammonium acetate, acetic acid, sulfamic acid, other suitable buffer, or any combination thereof. The buffer can be added to delay the change in pH that may result from the oxidation of water that may produce hydrogen ions. The rate of the reaction can be altered to delay or increase the release of energy from the exothermic reaction by adding a surfactant to the reaction. The rate may additionally be controlled by the surfactant used or the concentration of the surfactant in the reaction mixture. For example, the surfactant can include one or more of an amphoteric surfactant, a non-ionic surfactant, an anionic surfactant, other suitable surfactants, or any suitable combination thereof.

At block 304 an exothermic reaction is caused in the wellbore 104. When the reaction mixture reaches a point of initiation, the ammonium-based compound and sodium nitrite may react, which may cause the release of energy. The point of initiation may include the instance in which the activation energy of the reaction mixture is achieved for the transition state to occur. The activation energy of a reaction may be a property of the reactants in a reaction. The activation energy used to reach the point of initiation can include a temperature change, a pH shift, the addition of a catalyst, and the like. For example, the reaction mixture of sodium nitrite and ammonium chloride may reach the point of initiation at a temperature of 77° F. (25° C.) or at a pH at or below 5. The energy of the reaction mixture may release in the form of heat to the surrounding fluids to increase the temperature of the wellbore 104 in a select region. The ammonium-based compound can comprise an ammonium-based salt such as ammonium chloride, ammonium carbonate, ammonium acetate, ammonium phosphate, ammonium nitrate, other suitable salts, or any combination thereof. The ammonium-based compound can comprise a compound derived from ammonia, such as urea. In some embodiments, urea can react with sodium nitrite and can generate energy, released as heat, to the surrounding environment. For example, the reaction of ammonium chloride and sodium nitrite can generate nitrogen gas to increase pressure within the wellbore 104. Additionally, the reaction can generate energy, released as heat, to the surrounding environment. In the low temperature segment 116 of the wellbore 104, the reaction may not initiate without the addition of the catalyst.

To initiate the reaction in a low temperature segment, a catalyst can be added to the reaction mixture. The catalyst can be an oxidizer such as sodium persulfate, ammonium persulfate, potassium persulfate, potassium dichromate, potassium percarbonate, sodium percarbonate, other suitable catalyst, or any suitable combination thereof. For example, sodium persulfate in water can generate sulfate anions and hydrogen ions. As the sodium persulfate oxidizes water, the sodium persulfate can generate the sodium ions, the hydrogen ions, and the sulfate ions. Additionally, hydrogen ions can reduce the pH to below 5 thereby initiating the reaction of the ammonium-based compound and the sodium chloride. The hydrogen ions can be used to catalyze the reaction of ammonium chloride and sodium nitrite. In some examples, to delay the oxidation of the water to generate the hydrogen ions, the oxidizer may be encapsulated in a soluble polymer for delayed release. As the polymer is solubilized in a liquid the oxidizer may be released and may start generating hydrogen ions to further catalyze the reaction between sodium nitrite and an ammonium-based compound.

In some examples, the oxidizer can be added as a solid to the reaction mixture of sodium nitrite and the ammonium-based compound. The oxidizer can include, for example, sodium persulfate that can be added in a solid form to the reaction mixture. The sodium persulfate may additionally be dissolved first in a solution before being added to the reaction mixture of sodium nitrite and the ammonium-based compound. In some examples, the sodium nitrite may be first dissolved in a solution before being added to the reaction mixture with an ammonium-based compound.

Additionally, the ammonium-based compound may be first dissolved in a solution before being added to the reaction mixture. The solution may include one or more of water, fresh water, produced water, brine, other flow back fluids, organic solvents, inorganic solvents, etc. In some cases, the solution may include minerals, salts, hydrocarbons, or viscosity modifying additives such as guar, polyacrylamide, cellulose-derived polymers, and the like.

Other methods for delaying the exothermic reaction by use of the catalyst can include encapsulating the catalyst in a soluble polymer. Upon addition to the mixture, the polymer may be solubilized, and the catalyst can be released into the mixture. Alternatively, the exothermic reaction mixture can be delayed by adding, to the mixture, a crystalline form of the catalyst. The crystalline form can include larger particles that may take an increased time to dissolve. The increased time can increase the delay of the exothermic reaction mixture.

At block 306, damaging material is removed, using the exothermic reaction, from the wellbore 104 for controlling a production operation or any other suitable wellbore operation. The exothermic reaction mixture can generate heat upon reacting, increase the temperature of the low temperature segment 116, and break down, dissolve, or thin down the damaging material such that it can be removed from the tubular or flowline 106 of the wellbore 104. For example, the increase in heat caused by the exothermic reaction can cause the damaging material to be removed from the wellbore 104. The exothermic reaction of an ammonium-based compound and sodium nitrite, or other suitable reactants for the exothermic reaction, can generate nitrogen gas. For example, nitrogen gas can be generated from the exothermic reaction and can create a pressure increase in the wellbore. The pressure change may aid in removing damaging material from the wellbore. The damaging material, once released from the tubular or flowline 106, after the exothermic reaction, can be pumped from the wellbore 104 or can be returned to the subterranean formation 102.

Figure 4:
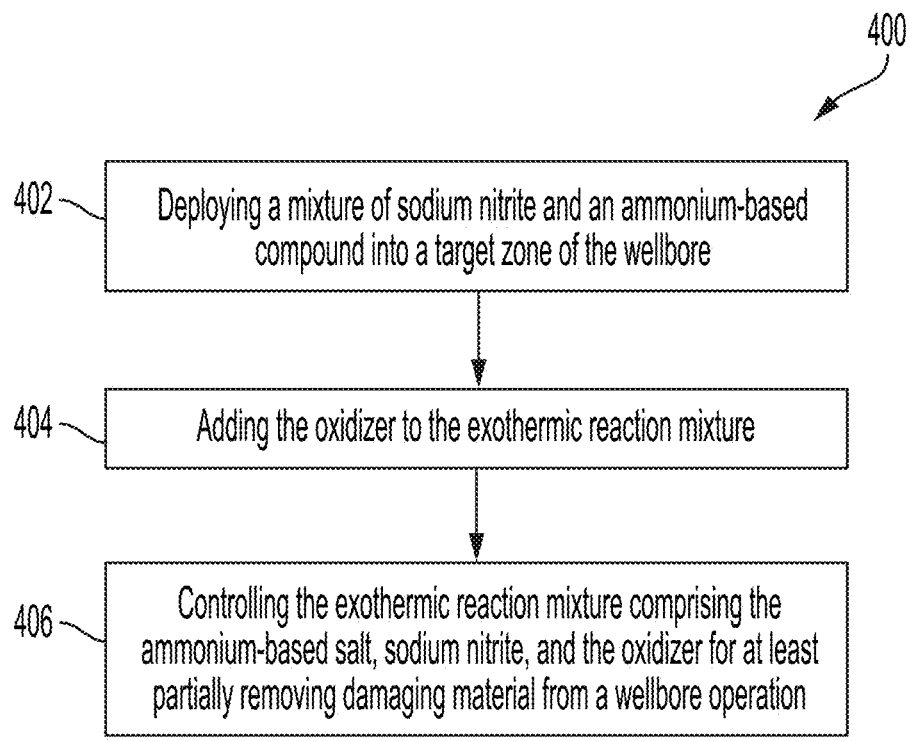
FIG. 4 is a flowchart of a process for injecting an exothermic reaction mixture and low temperature catalyst into a wellbore and into the subterranean formation or into a pipeline for removing damaging material from the wellbore or pipeline according to one example of the present disclosure.

FIG. 4 is a flowchart of a process 400 for injecting an exothermic reaction mixture into a wellbore according to one example of the present disclosure. At block 402 a reaction mixture is deployed into a target zone of the wellbore 104. The target zone can include the low temperature segment 116 within the tubular or flowline 106 in the wellbore 104. Additionally, the target zone may be a segment within the tubular or flowline 106 where the flow of a hydrocarbon fluid has been decreased from a normal flow rate. The reaction mixture can be deployed to the target zone using the tubing 112. For example, the wellbore operator or automatic control device may determine an area of low temperature and designate the area as the low temperature segment 116. Additionally, the low temperature segment 116 may be located by a reduced pressure flow through the wellbore 104 due to the damaging material 118 on the tubular or flowline 106. The reaction mixture may be injected into the tubular or flowline 106 within the wellbore 104 through the tubing 112. The tubing 112 may be in fluid communication with the fluid pumps 110 at the surface 108. The mixture of sodium nitrite and ammonium-based compound may not initiate an exothermic reaction in the low temperature segment 116.

At block 404 a catalyst, such as an oxidizer, is added to the sodium nitrite and ammonium-based compound mixture. The oxidizer in water may generate hydrogen ions ($H^+$) that can catalyze the reaction of sodium nitrite and the ammonium-based compound at low temperatures. For example, the ammonium-based compound can be urea. The reaction between urea and sodium nitrite can generate energy in the form of heat that can be released to the surrounding environment. In some examples, the oxidizer can be added in a concentration that may depend on the reaction mixture of sodium nitrite and the ammonium-based compound. The oxidizer can initiate the reaction at a temperature below approximately 90° F. (32° C.). For example, the oxidizer can initiate the reaction at a temperature at or below 80° F. (26° C.), at or below 70° F. (21° C.), at or below 60° F. (15° C.), at or below 50° F. (10° C.), or at or below 39° F. (4° C.).

At block 406 the exothermic reaction mixture comprising the ammonium-based compound, sodium nitrite, and the oxidizer is controlled for removing the damaging material 118 from a wellbore 104. The reaction of the ammonium-based compound and sodium nitrite may not initiate when the pH measures above 5 or if the temperature of the wellbore drops below 70° F. (21° C.). In both situations, adding the oxidizer can allow for the reaction to initiate and to generate the heat that may be used as an aid in removing the damaging material. To control the rate of the reaction, other solutions or material can be added to the reaction mixture. The other solutions or material can include buffers, surfactants, solvents, and other suitable solutions or material.

Buffers can be used to limit the change in pH of a liquid when adding another liquid to the reaction mixture. A buffer can be added to the exothermic reaction mixture to delay the pH change from alkaline to acidic when the oxidizer is introduced. For example, an oxidizer, such as sodium persulfate, can be added to water and can generate sulfate anion and hydrogen ions. The release of the hydrogen ions can change the pH from an alkaline pH to an acidic pH. A buffer can be added to the oxidizer solution to reduce the pH change as water is oxidized and control the pH of the liquid solution. Over time, as the oxidizer continues to interact with water, the pH may gradually become more acidic and can thereby delay the reaction between the sodium nitrite and the ammonium-based compound. For example, the buffer can be a combination of one or more of ammonium hydroxide, sodium bicarbonate, sodium hydroxide, potassium carbonate, ammonium acetate, acetic acid, or sulfamic acid.

The surfactant can be added to the exothermic reaction mixture to trap pockets of the oxidizer within the surrounding liquid film layer. The surfactants can allow a large surface area interface between the oxidizer and the reaction mixture. The increased surface area interaction can be energetically stable. The surfactant can lower the interfacial tension between the liquid component of the ammonium-based compound and the liquid component of the sodium nitrite. Such an aspect may allow the ammonium-based compound and sodium nitrite solutions to increase respective mobilities and increase respective rates of interaction. For example, the surfactant can include an amphoteric surfactant, a non-ionic surfactant, an anionic surfactant, other suitable surfactants, or any suitable combination thereof.

The solvent used can include xylene, toluene, benzene, or other high-solvency liquids to aid in removing the damaging material 118 from the wall of the tubular or flowline 106 within the wellbore 104. For example, toluene can increase the generation of ions within the reaction mixture by increasing the rate at which the ammonium-based compound and sodium nitrite dissociate. Additionally, or alternatively, the solvent may not impact the heat generated by the exothermic reaction while causing a change in the rate of reaction. The solvent may help solubilize the damaging material 118 (at higher temperatures).

Figure 5:
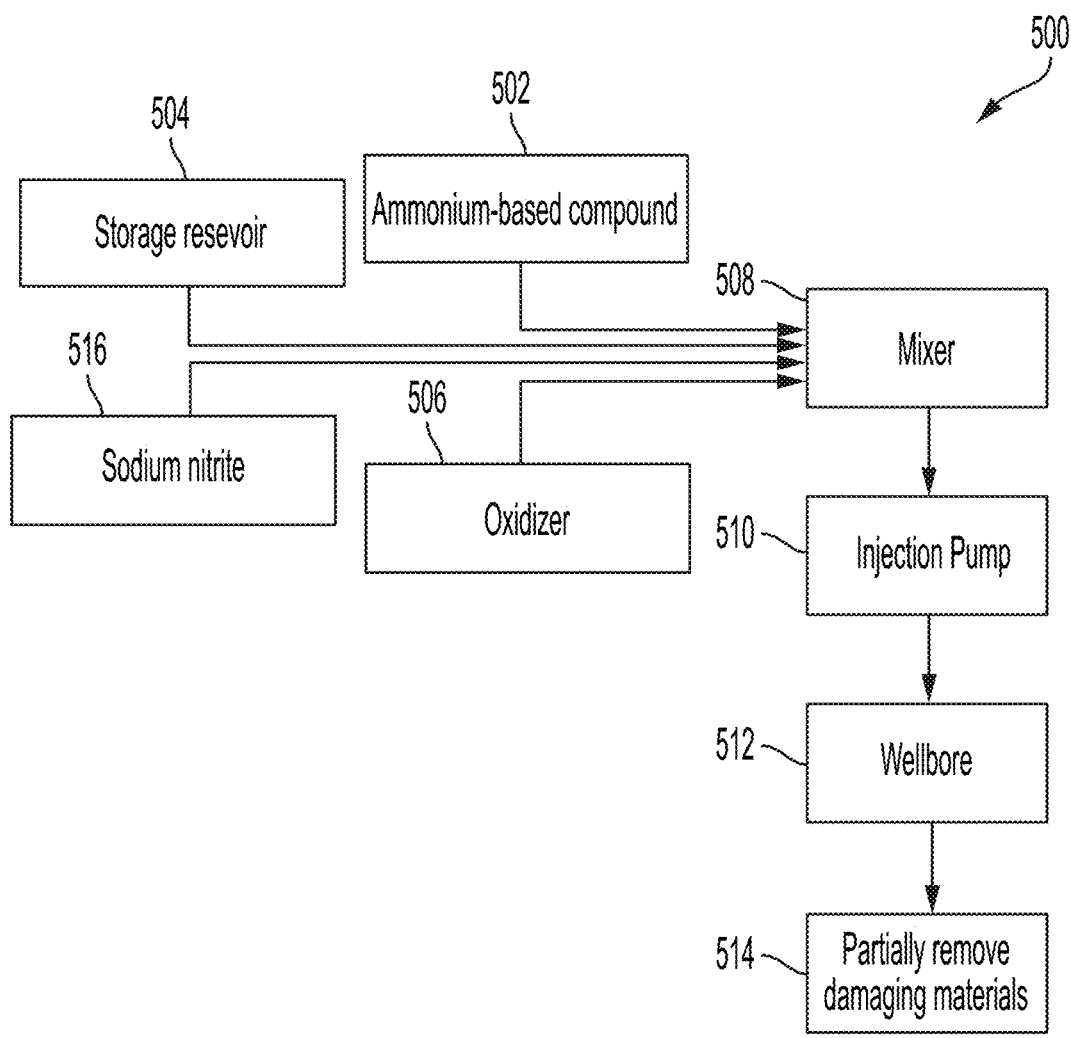
FIG. 5 is a block diagram of a process flow for using an exothermic reaction mixture and lower temperature catalyst to remove damaging material such as paraffin from a subterranean formation, a wellbore, or a pipeline according to one example of the present disclosure.

FIG. 5 is a block diagram of a process flow 500 for using an exothermic reaction mixture and a catalyst to remove damaging material from the wellbore 104 according to one example of the present disclosure. The process may involve one or more reservoirs for storing the ammonium-based compound 502, sodium nitrite 516, oxidizer 506 and one or more of the buffer, solvents, and surfactant additives, via storage reservoir 504. The reservoirs can be in fluid connection with a mixer 508 that contacts the oxidizer 506, ammonium-based compound 502, and sodium nitrite 516 to form the exothermic reaction mixture having the low-temperature catalyst. The mixture can be in fluid communication with the injection pump 510 to inject the mixture fluid into the wellbore 512. The storage reservoir 504 can be used for the buffer, solvent, surfactant, or combination thereof and can be added to the mixer 508 to control the exothermic reaction. The reaction mixture can be injected into the wellbore 512 for removing damaging materials 514 from the wellbore 512. For example, the sodium nitrite can be dissolved to form a solution of nitrite ions. The solution of sodium nitrite ions can be mixed with a solution of ammonium ions to form the exothermic reaction mixture. The exothermic reaction mixture (including nitrite ions and ammonium ions) can be mixed with a solution including the oxidizer. The solution including the oxidizer, nitrite ions, and ammonium ions can be mixed in the mixer 508 before being infected into the wellbore or flowline 215 through the injection pump 510.

In some examples, the reaction mixture can include the ammonium-based compound, the sodium nitrite, and the oxidizer for delayed release of the energy. In some embodiments, the reaction mixture can include the sodium nitrite, the ammonium-based compound, the oxidizer, and a solvent to reduce the delay in the reaction and generate the energy release faster. The increased reaction rate, for example, can be used when the low temperature segment 116 can be closer to the surface and may not involve a long delay. Additionally, the oxidizer 506 and buffer that can be in the storage reservoir 504 can be injected into the wellbore or flowline 512 at a time following the initial injection of the ammonium ion and nitrite ion solution that forms the exothermic reaction mixture.

In some examples, a buffer can be added to the reaction mixture to delay the exothermic reaction. Alternatively, the storage reservoir 504 can be used for a surfactant. The surfactant can control the rate or the reaction by increasing the interactions between the ammonium-based compound and the sodium nitrite. Additionally, or alternatively, the surfactant can delay the reaction between the ammonium-based compound and the sodium nitrite by generating micelles in the mixture. The micelles may act as an encapsulating agent whereby within the interior of the micelles the oxidizer can be trapped. In low temperature zones, the micelles can prevent the oxidizer from acting as a catalyst in the reaction and can delay the energy release of the reaction.

In one or more examples, the ammonium-based compound, the oxidizer, and the sodium nitrite may be dissolved in a solution. The solution may be water, fresh water, produced water, brine, organic or inorganic solvents, or other flow-back fluids. In some examples, the solution may include minerals, salts, hydrocarbons, or viscosity-modifying additives such as guar, polyacrylamide, or cellulose-derived polymers.

Figure 6:
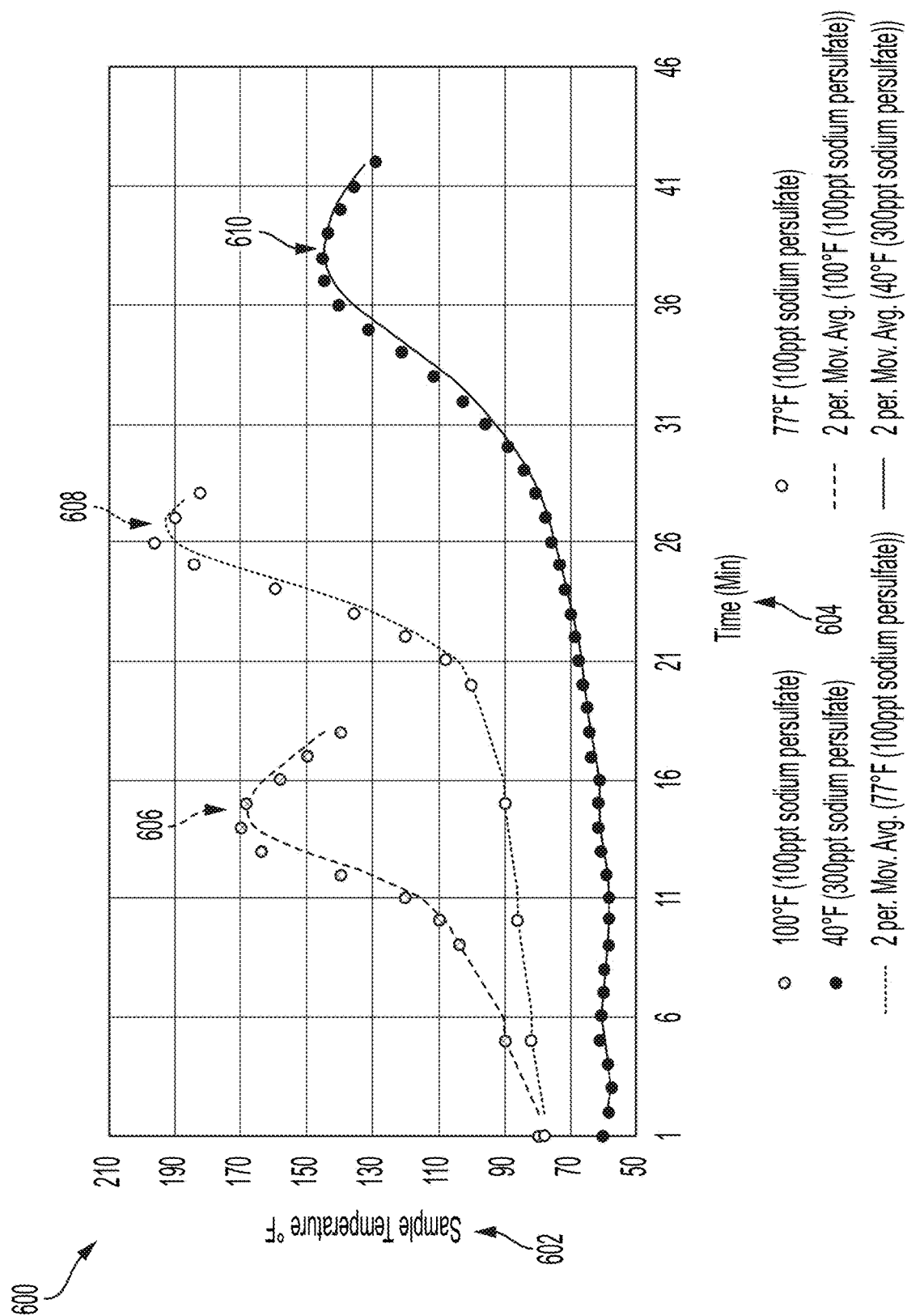
FIG. 6 is a graph of the temperature of an exothermic reaction and lower temperature catalyst in response to a change in the initial temperature of the reaction according to one example of the present disclosure.

FIG. 6 is a graph 600 of sample temperature vs. time according to one example of the present disclosure. The sample temperature 602 may be the y-axis, and the time 604 may be the x-axis. The exothermic reaction resulting from the ammonium-based compound, sodium nitrite, and the oxidizer may be illustrated by the graph 600. As illustrated, the exothermic reaction may generate energy in the form of heat above 130° F. (55° C.) when the starting temperature was varied. The reaction, when held at a 100° F. (38° C.) starting point 606, may produce the maximum energy release in under 16 minutes, while the reaction at 77° F. (25° C.) 608 may reach maximum energy release in around 26 minutes. The reaction in low temperature environment 610 may demonstrate that the maximum energy release in over 36 minutes while still sufficiently heating the solution to above 130° F. (55° C.).

In some examples, the concentration of the sodium nitrite and the ammonium-based compound can be adjusted to increase the temperature release from the reaction. For example, the reaction mixture can be a 1:1 ratio of sodium nitrite to ammonium-based compound. Additionally, the reaction mixture may be 1:2, 1:3, 1:4, 2:1, 3:1, or 4:1 respectively or any variation or deviation thereof.

The graph 600 may imply that an oxidizer, for example sodium persulfate, can initiate the exothermic reaction of an ammonium-based compound and sodium nitrite at temperatures below 25° C. (77° F.) as illustrated by the low temperature environment 610. The maximum temperature generated by the low temperature reaction was lower than the room temperature and high temperature tests. The lower temperature maximum can be due to heat dissipation to the surrounding environment. The temperature increase in the low temperature environment (39° F. or 4° C.) can remove damaging material from the wellbore 104. Additionally, the graph illustrates that the concentration of the oxidizer can control the reaction time of the exothermic reaction.

Figure 7:
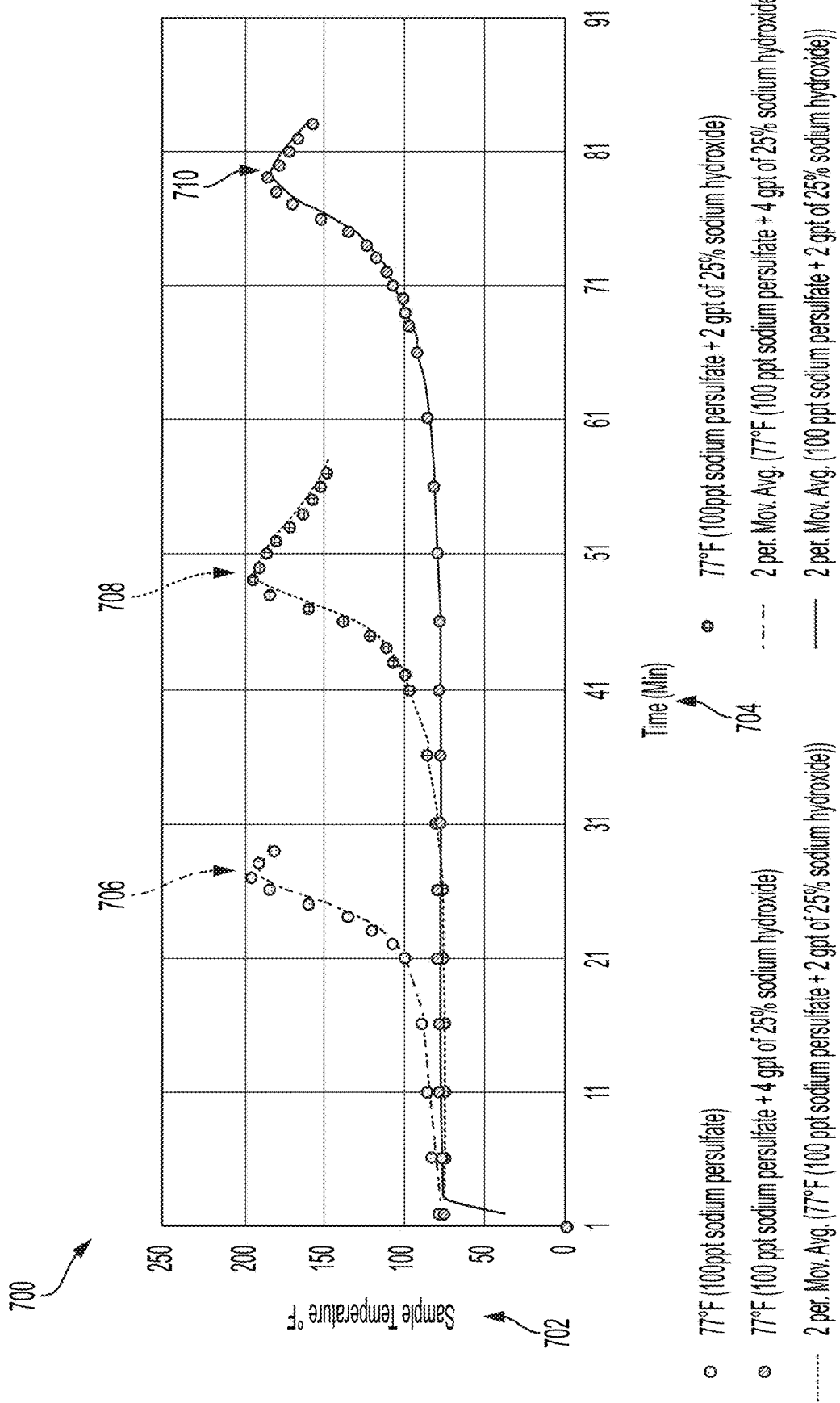
FIG. 7 is a graph of the temperature of an exothermic reaction in response to using buffers for delaying the reaction of the low-temperature catalyst and exothermic reaction according to one example of the present disclosure.

FIG. 7 is a graph 700 of sample temperature vs. time in response to the addition of buffer according to one example of the present disclosure. The sample temperature 702 may be the y-axis and the time 704 may be the x-axis. The graph 700 illustrates that the time for the exothermic reaction to occur may be adjusted by adjusting the buffer concentration. A buffer can be added to the exothermic reaction mixture to delay initiating the exothermic reaction by maintaining a neutral pH as the oxidizer generates hydrogen ions. For example, the buffer can be a combination of one or more of ammonium hydroxide, sodium bicarbonate, sodium hydroxide, potassium carbonate, ammonium acetate, acetic acid, or sulfamic acid. The graph illustrates that the exothermic reaction without the addition of a buffer and 100 lbm/1000 gallons (ppt) of sodium persulfate 706 can reach maximum energy release, in the form of heat, in under 31 minutes. The exothermic reaction mixture with the addition of 100 lbm/1000 gallons (ppt) sodium persulfate and 2 gallons/1000 gallons (gpt) 25% sodium hydroxide buffer 708 demonstrated an increase in time before the maximum energy release was achieved. The time for the reaction to reach the maximum energy release was greater than 45 minutes. Additionally, the exothermic reaction mixture with the addition of 100 ppt sodium persulfate and 4 gpt of 25% sodium hydroxide buffer 710 demonstrated an increase in time for the reaction to reach the maximum energy release. The reaction with 100 ppt sodium persulfate and 4 gpt of 25% sodium hydroxide buffer 710 demonstrated a maximum energy release after 75 minutes.

The addition of the buffer to the exothermic reaction demonstrates that the buffer does not impact the sample temperature 702 while the buffer can delay the time for the reaction to initiate and reach the maximum energy release.

Additionally, the results in FIG. 7 can imply that varying the buffer concentration within the reaction mixture can adjust a progression of the exothermic reaction.

In some aspects, methods and mixtures for a low temperature catalyst for causing an exothermic reaction for removing damaging material from a wellbore during wellbore operations are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a method comprising: forming an exothermic reaction mixture comprising sodium nitrite, an ammonium-based compound, and a catalyst that—comprises an oxidizer; and providing the exothermic reaction mixture in a fluid flow path for initiating an exothermic reaction to at least partially remove damaging material from the fluid flow path.

Example 2 is the method of example 1, wherein the ammonium-based compound comprises a compound selected from the group consisting of ammonium chloride, ammonium carbonate, ammonium acetate, ammonium phosphate, ammonium nitrate, urea, and any combination thereof, and wherein the catalyst comprises a compound selected from the group consisting of sodium persulfate, ammonium persulfate, potassium persulfate, potassium dichromate, potassium percarbonate, sodium percarbonate, and any combination thereof.

Example 3 is the method of example 1, wherein forming the exothermic reaction mixture includes adding, to solutions of sodium ions and ammonium ions to form the exothermic reaction mixture, a surfactant for controlling the exothermic reaction, and wherein the surfactant is an anionic surfactant, an amphoteric surfactant, or a non-ionic surfactant.

Example 4 is the method of example 1, wherein forming the exothermic reaction mixture includes adding, to solutions of sodium ions and ammonium ions to form the exothermic reaction mixture, a buffer to the exothermic reaction mixture for delaying a progression of the exothermic reaction, and wherein the buffer comprises a compound selected from the group consisting of ammonium hydroxide, sodium bicarbonate, sodium hydroxide, potassium carbonate, ammonium acetate, acetic acid, or sulfamic acid.

Example 5 is the method of example 1, further comprising encapsulating the catalyst for delayed release within the fluid flow path for initiating the exothermic reaction, wherein the fluid flow path includes a pipeline, flowline, wellbore or subterranean formation.

Example 6 is the method of example 1, wherein the catalyst is a low-temperature catalyst, and wherein providing the exothermic reaction mixture in the fluid flow path includes initiating the exothermic reaction in the fluid flow path at a temperature below 70° F., wherein the fluid flow path includes a pipeline, flowline, wellbore or subterranean formation.

Example 7 is the method of example 1, further comprising: determining a pH of the exothermic reaction mixture within the fluid flow path; and adding, to the exothermic reaction, the catalyst in response to determining that the pH of the exothermic reaction mixture is greater than 5.

Example 8 is a reaction mixture comprising: an ammonium-based compound; sodium nitrite; and a catalyst that comprises an oxidizer for initiating an exothermic reaction using the reaction mixture, the exothermic reaction controllable in a fluid flow path to at least partially remove damaging material from the fluid flow path.

Example 9 is the reaction mixture of example 8, wherein the ammonium-based compound comprises a compound selected from the group consisting of ammonium chloride, ammonium carbonate, ammonium acetate, ammonium phosphate, ammonium nitrate, urea, and combinations thereof, and wherein the catalyst comprises a compound selected from the group consisting of sodium persulfate, ammonium persulfate, potassium persulfate, potassium dichromate, potassium percarbonate, sodium percarbonate, and any combination thereof.

Example 10 is the reaction mixture of example 8, further comprising a surfactant, wherein the surfactant is an anionic surfactant, amphoteric surfactant, non-ionic surfactant, and wherein the surfactant is addable to the reaction mixture for controlling the exothermic reaction.

Example 11 is the reaction mixture of example 8, wherein the catalyst is encapsulated for delayed release within the exothermic reaction.

Example 12 is the reaction mixture of example 8, further comprising a buffer to delay initiation of the exothermic reaction, wherein the buffer comprises a compound selected from the group consisting of ammonium hydroxide, sodium bicarbonate, sodium hydroxide, potassium carbonate, ammonium acetate, acetic acid, or sulfamic acid.

Example 13 is the reaction mixture of example 8, further comprising a solvent for removing the damaging material from the fluid flow path, wherein the ammonium-based compound, the sodium nitrite, and the catalyst are dissolved in the solvent, and wherein the solvent comprises a compound selected from the group consisting of toluene, xylene, or benzene.

Example 14 is the reaction mixture of example 8, wherein the catalyst is a low-temperature catalyst, and wherein the exothermic reaction in the fluid flow path is initiatable at temperature below 70° F., wherein the fluid flow path includes a pipeline, flowline, wellbore or subterranean formation.

Example 15 is the reaction mixture of example 8, wherein the catalyst is addable to the reaction mixture after determining that a pH of the reaction mixture is greater than 5 for initiating the exothermic reaction.

Example 16 is a method comprising: deploying a reaction mixture of sodium nitrite and an ammonium-based compound into a target zone of a fluid flow path; adding a catalyst that includes an oxidizer to the reaction mixture; and controlling an exothermic reaction initiated using the ammonium-based compound, the sodium nitrite, and the catalyst for at least partially removing damaging material from the fluid flow path.

Example 17 is the method of example 16, wherein controlling the exothermic reaction comprises adding a buffer to the reaction mixture for controlling a progression of the exothermic reaction, and wherein the buffer comprises a compound selected from the group consisting of ammonium hydroxide, sodium bicarbonate, sodium hydroxide, potassium carbonate, ammonium acetate, acetic acid, sulfamic acid, and combinations thereof.

Example 18 is the method of example 16, wherein controlling the exothermic reaction comprises adding a surfactant to the reaction mixture for controlling the exothermic reaction, and wherein the surfactant is an anionic surfactant, an amphoteric surfactant, or a non-ionic surfactant.

Example 19 is the method of example 16, wherein deploying the reaction mixture includes adding, to a solution of sodium ions and ammonium ions, a solvent for removing the damaging material from the fluid flow path, and wherein the solvent comprises a compound selected from the group consisting of toluene, xylene, benzene, and combinations thereof.

Example 20 is the method of example 16, further comprising: determining a pH of the reaction mixture in the fluid flow path; determining a temperature in the fluid flow path; and adding, to the reaction mixture, the catalyst in response to a pH of greater than 5 or a temperature below 70° F. for initiating the exothermic reaction, wherein the fluid flow path includes a pipeline, flowline, wellbore or subterranean formation.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method comprising:
    forming an exothermic reaction mixture comprising sodium nitrite, an ammonium-based compound, a catalyst that comprises an oxidizer, and a solvent for removing damaging material from a wellbore;
    providing the exothermic reaction mixture in a fluid flow path for initiating an exothermic reaction; and
    initiating the exothermic reaction in the fluid flow path in a temperature range from approximately 39° F. to 60° F. to at least partially remove damaging material from the fluid flow path.

2. The method of claim 1, wherein the ammonium-based compound comprises a compound selected from the group consisting of ammonium carbonate, ammonium acetate, ammonium phosphate, ammonium nitrate, urea, and combinations thereof, wherein the catalyst comprises a compound selected from the group consisting of sodium persulfate, ammonium persulfate, potassium persulfate, potassium dichromate, potassium percarbonate, sodium percarbonate, and any combination thereof, wherein the solvent is selected from toluene or xylene.

3. The method of claim 1, wherein forming the exothermic reaction mixture includes adding, to solutions of sodium ions and ammonium ions to form the exothermic reaction mixture, a surfactant for controlling the exothermic reaction, and wherein the surfactant is an anionic surfactant, an amphoteric surfactant, or a non-ionic surfactant.

4. The method of claim 1, wherein forming the exothermic reaction mixture includes adding, to solutions of sodium ions and ammonium ions to form the exothermic reaction mixture, a buffer to the exothermic reaction mixture for delaying a progression of the exothermic reaction, and wherein the buffer comprises a compound selected from the group consisting of ammonium hydroxide, sodium bicarbonate, sodium hydroxide, potassium carbonate, ammonium acetate, acetic acid, sulfamic acid and combinations thereof.

5. The method of claim 1, further comprising encapsulating the catalyst for delayed release within the fluid flow path for initiating the exothermic reaction, wherein the catalyst is a low temperature catalyst, and wherein the fluid flow path includes a pipeline, flowline, wellbore or subterranean formation.

6. The method of claim 1, further comprising:
    determining a pH of the exothermic reaction mixture within the fluid flow path; and
    adding, to the exothermic reaction, the catalyst in response to determining that the pH of the exothermic reaction mixture is greater than 5.

7. The method of claim 1, wherein the damaging material comprises waxes, paraffin deposits, or scales that restrict a flow of hydrocarbon fluid with respect to the fluid flow path.

8. A reaction mixture comprising:
    an ammonium-based compound;
    sodium nitrite;
    a catalyst that comprises an oxidizer for initiating an exothermic reaction using the reaction mixture; and
    a solvent for removing damaging material from a wellbore, the exothermic reaction controllable in a fluid flow path to at least partially remove damaging material from the fluid flow path, wherein the exothermic reaction is initiated in the fluid flow path in a temperature range from approximately 39° F. to 60° F.

9. The reaction mixture of claim 8, wherein the ammonium-based compound comprises a compound selected from the group consisting of ammonium carbonate, ammonium acetate, ammonium phosphate, ammonium nitrate, urea, and combinations thereof, and wherein the catalyst comprises a compound selected from the group consisting of sodium persulfate, ammonium persulfate, potassium persulfate, potassium dichromate, potassium percarbonate, sodium percarbonate, and combinations thereof.

10. The reaction mixture of claim 8, further comprising a surfactant, wherein the surfactant is an anionic surfactant, amphoteric surfactant, non-ionic surfactant, and wherein the surfactant is addable to the reaction mixture for controlling the exothermic reaction.

11. The reaction mixture in claim 8, wherein the catalyst is encapsulated for delayed release within the exothermic reaction.

12. The reaction mixture in claim 8, further comprising a buffer to delay initiation of the exothermic reaction, wherein the buffer comprises a compound selected from the group consisting of ammonium hydroxide, sodium bicarbonate, sodium hydroxide, potassium carbonate, ammonium acetate, acetic acid, sulfamic acid, and combinations thereof.

13. The reaction mixture of claim 8, wherein the ammonium-based compound, the sodium nitrite, and the catalyst are dissolved in the solvent, and wherein the solvent comprises a compound selected from the group consisting of toluene, xylene, benzene, and combinations thereof.

14. The reaction mixture of claim 8, wherein the catalyst is a low-temperature catalyst, and wherein the fluid flow path includes a pipeline, flowline, wellbore or subterranean formation.

15. The reaction mixture of claim 8, wherein the catalyst is addable to the reaction mixture after determining that a pH of the reaction mixture is greater than 5 for initiating the exothermic reaction.

16. A method comprising:
    deploying a reaction mixture of sodium nitrite and an ammonium-based compound into a target zone of a fluid flow path;
    adding a catalyst that includes an oxidizer to the reaction mixture;
    adding a solvent for removing damaging material from a wellbore; and
    controlling an exothermic reaction initiated using the ammonium-based compound, the sodium nitrite, and the catalyst for at least partially removing damaging material from the fluid flow path, wherein the exothermic reaction is initiated in the fluid flow path in a temperature range from approximately 39° F. to 60° F.

17. The method of claim 16, wherein controlling the exothermic reaction comprises adding a buffer to the reaction mixture for controlling a progression of the exothermic reaction, and wherein the buffer comprises a compound selected from the group consisting of ammonium hydroxide, sodium bicarbonate, sodium hydroxide, potassium carbonate, ammonium acetate, acetic acid, sulfamic acid, and combinations thereof.

18. The method of claim 16, wherein controlling the exothermic reaction comprises adding a surfactant to the reaction mixture for controlling the exothermic reaction, and wherein the surfactant is an anionic surfactant, an amphoteric surfactant, or a non-ionic surfactant.

19. The method of claim 16, further comprising:
 determining a pH of the reaction mixture in the fluid flow path;
 determining a temperature in the fluid flow path; and
 adding, to the reaction mixture, the catalyst in response to a pH of greater than 5 or a temperature below 70° F. for initiating the exothermic reaction, wherein the fluid flow path includes a pipeline, flowline, wellbore or subterranean formation.

\* \* \* \* \*